(12) United States Patent
Yatabe

(10) Patent No.: US 6,241,093 B1
(45) Date of Patent: *Jun. 5, 2001

(54) CASSETTE ACCOMMODATION CASE

(75) Inventor: Kazumoto Yatabe, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/348,269

(22) Filed: Jul. 7, 1999

(30) Foreign Application Priority Data

Jul. 9, 1998 (JP) .................................................. 10-194604

(51) Int. Cl.⁷ .................................................. B65D 85/575
(52) U.S. Cl. ........................ 206/387.1; 206/493; 206/1.5
(58) Field of Search ............................ 206/387.1, 387.13, 206/493, 478, 480, 1.5, 473, 475

(56) References Cited

U.S. PATENT DOCUMENTS

| | | |
|---|---|---|
| 3,663,492 | 5/1972 | Wallace . |
| 3,777,881 | 12/1973 | Schwartz . |
| 3,876,071 * | 4/1975 | Neal et al. ........................ 206/387.1 |
| 4,011,940 * | 3/1977 | Neal et al. ........................ 206/387.1 |
| 4,067,629 | 1/1978 | Amatsu . |
| 4,304,331 | 12/1981 | Minkow . |
| 4,322,000 | 3/1982 | Struble . |
| 4,365,713 * | 12/1982 | Ekuan ............................... 206/387.1 |
| 4,406,369 | 9/1983 | Wallace et al. . |
| 4,512,470 * | 4/1985 | Sieben ............................... 206/387.1 |
| 4,555,021 | 11/1985 | Fujii et al. . |
| 4,796,753 | 1/1989 | Fujii . |
| 4,828,105 | 5/1989 | Silengo et al. . |
| 4,865,195 * | 9/1989 | Brands ............................... 206/387.1 |
| 4,911,298 | 3/1990 | Miyagawa et al. . |
| 4,928,825 * | 5/1990 | Hehn ................................. 206/387.1 |
| 4,948,022 | 8/1990 | VanDyke . |
| 5,038,932 | 8/1991 | Sheu . |
| 5,165,541 | 11/1992 | Morita . |
| 5,282,536 | 2/1994 | Sato et al. . |
| 5,373,941 | 12/1994 | Morita . |
| 5,499,714 * | 3/1996 | Konno .............................. 206/387.13 |
| 5,503,272 | 4/1996 | Morita . |
| 5,518,116 | 5/1996 | Morita . |
| 5,560,481 | 10/1996 | Doodson et al. . |
| 5,586,654 | 12/1996 | Katagiri . |
| 5,775,500 | 7/1998 | Williams . |
| 5,788,068 * | 8/1998 | Fraser et al. ......................... 206/310 |
| 5,913,423 * | 6/1999 | Sasaki ............................... 206/387.12 |
| 6,009,999 * | 1/2000 | Morita et al. ..................... 206/387.13 |

FOREIGN PATENT DOCUMENTS

| | | |
|---|---|---|
| 0 493 845 | 7/1992 | (EP) . |
| 0 506 173 | 9/1992 | (EP) . |
| 0 872 841 | 10/1998 | (EP) . |
| 2 306 498 | 10/1976 | (FR) . |
| 2 508 222 | 12/1982 | (FR) . |
| 2 231 861 | 11/1990 | (GB) . |
| 98 01369 | 1/1998 | (WO) . |

* cited by examiner

*Primary Examiner*—Paul T. Sewell
*Assistant Examiner*—Shian Luong
(74) *Attorney, Agent, or Firm*—Ronald P. Kananen; Rader, Fishman & Grauer

(57) ABSTRACT

In a cassette accommodation case which has a structure allowing insertion and housing a cassette in a transverse direction from an insertion opening (2) formed on one side of the cassette accommodation case, and is formed with recess grooves (3a, 3b) for receiving a bulged portion of the cassette on an inner surface thereof, the cassette is securely held in the cassette accommodation case so as to prevent the cassette from suddenly slipping out of the opening. In the cassette accommodation case of the present invention, the recess groove (3b) is provided with a stopper member (25) having an engaging protrusion (25a), and when the cassette is housed in the cassette accommodation case, the engaging protrusion (25a) of the stopper member (25) is engaged with a capstan shaft insertion hole formed on the bulged portion of the cassette, and thereby, the cassette is securely held in the cassette accommodation case.

12 Claims, 10 Drawing Sheets

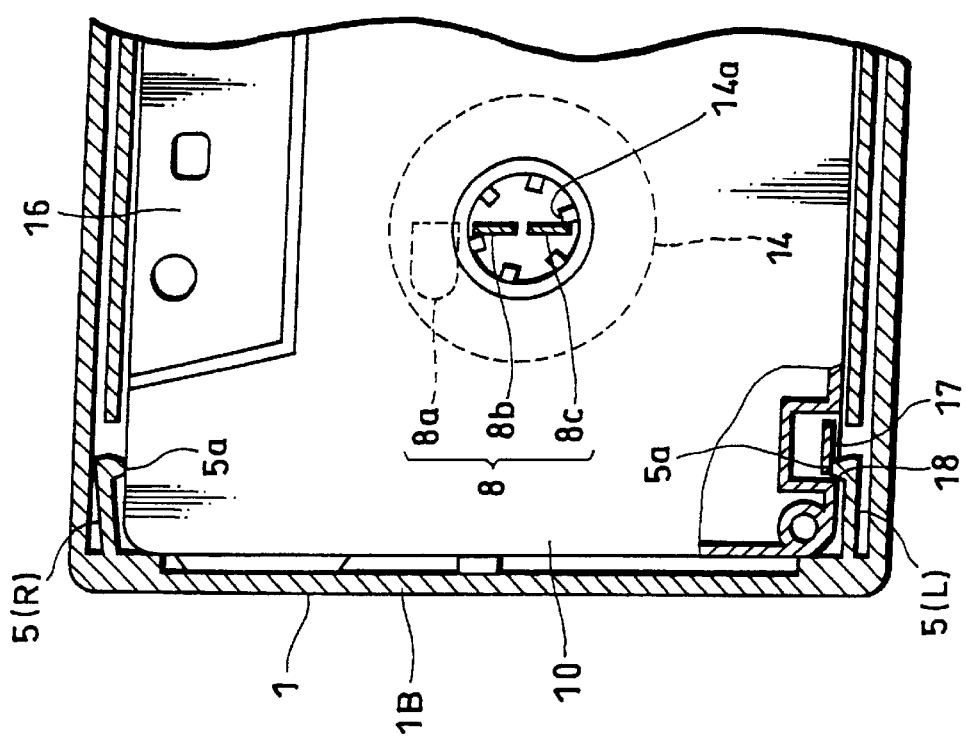
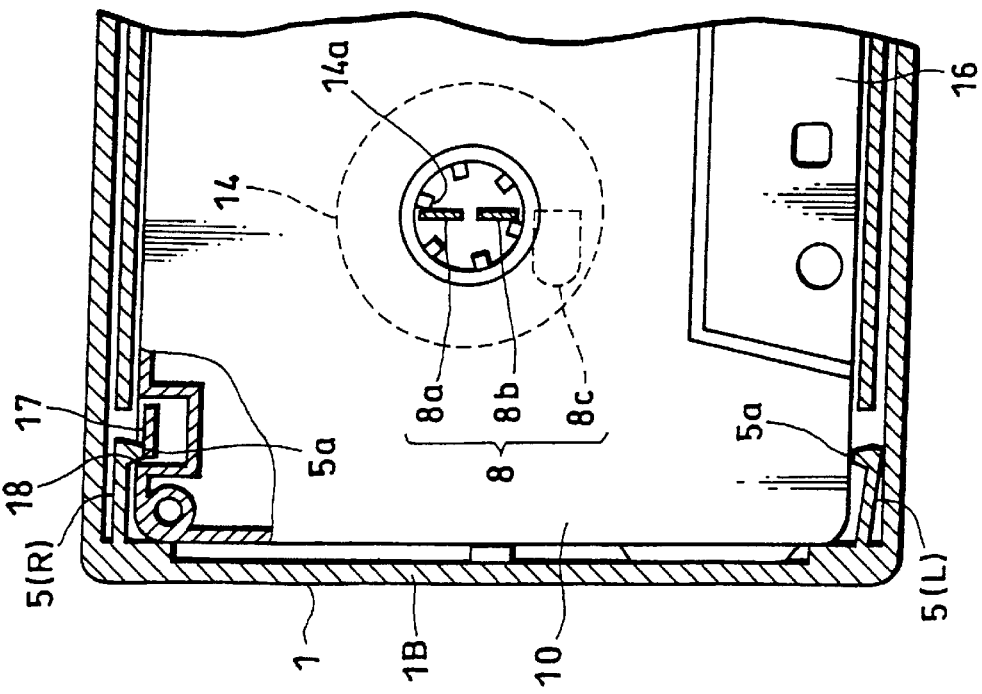

CASSETTE ACCOMMODATION CASE

BACKGROUND OF THE INVENTION

1. Field of the Invention

The present invention relates to a cassette accommodation case which is suitable for inserting and housing a tape cassette such as an audio compact cassette or the like, and in particular, to a slide type cassette accommodation case which inserts and stores a cassette in a transverse direction from an insertion opening formed on one side of the cassette accommodation case.

2. Description of the Related Art

In recent years, in a cassette accommodation case for inserting and housing an audio compact cassette, a slide type cassette accommodation case has been practically used which inserts and stores a cassette in a transverse direction from an insertion opening formed on one side of the cassette accommodation case.

FIG. 1 to FIG. 5 each show a structure of a conventional slide type cassette accommodation case.

In these figures, a reference numeral 1 denotes a cassette accommodation case, and an audio compact cassette (hereinafter, referred simply to as cassette) 10 is inserted in a transverse direction from an insertion opening 2 formed on one side of the case, and then, is stored in the cassette accommodation case 1.

First, a structure of the cassette 10 will be briefly described below. A cassette housing 11 of the cassette 10 is formed with hub driving shaft insertion holes 12 on its right and left sides. A pair of hubs 14 for winding a magnetic tape 13 are rotatably housed in an interior of the cassette housing 11 correspondingly to these hub driving shaft insertion holes 12.

A front side of the cassette housing 11 is formed with an opening portion 15 where the magnetic tape 13 is exposed. In the cassette housing 11, a tape traveling path is formed such that the magnetic tape 13 guided from one hub (a supply side hub) 14 passes through the opening portion 15, and then, is taken up around the other hub (a take-up side hub) 14.

A magnetic head or the like is inserted into the opening 15 from a cassette deck side, and in order to thicken a thickness of an insertion part such as the magnetic head or the like, the front side of the cassette housing 11 is formed with trapezoid-like bulged portions 16 which are bulged up and down, that is, in its both sides.

The bulged portions 16 are formed with capstan shaft insertion holes 19 and positioning reference holes 20 which are symmetrically situated with respect to left and right.

The cassette accommodation case 1, in which the cassette 10 is inserted, is constructed in a manner of combining an upper half 1A and a lower half 1B. The upper half 1A is a plastic molding product which is molded of e.g., a GPPS (general purpose polystyrene) material; on the other hand, the lower half 1B is a plastic molding product which is molded of e.g., a HIPS (high impact proof polystyrene) material. The upper half 1A and the lower half 1B are integrally made in a state of being combined with each other by ultrasonic welding or the like.

One side face of the cassette accommodation case 1 is formed with an insertion opening 2 which is wholly opened, and the cassette accommodation case has a structure in which the cassette 10 is slidably inserted and stored in a transverse direction from the insertion opening 2.

The cassette accommodation case 1 is constructed so that the cassette 10 is stored therein in a state that there is almost no gap. For this reason, in the interior of the cassette accommodation case 1, each of upper and lower halves 1A and 1B is formed with concave or recess grooves 3a and 3b for receiving the bulged portions 16 of the cassette 10 in the transverse direction, that is, a cassette inserting direction at its inner surface side.

These recess grooves 3a and 3b are symmetrically formed at both sides in the cassette inserting direction, and thereby, the cassette 10 can be inserted regardless of the orientations or directions of the cassette 10.

More specifically, FIG. 4A and FIG. 5A show a state that the bulged portion 16 is situated to a cassette inserting direction left side and that the cassette 10 is inserted into the cassette accommodation case 1. On the other hand, FIG. 4B and FIG. 5B show a state that the bulged portion 16 is situated to a cassette inserting direction right side and that the cassette 10 is inserted into the cassette accommodation case 1. As described above, it is possible to insert and store the cassette 10 in the cassette accommodation case 1 even if the cassette 10 is situated to whichever directions, and thereby, a user has no need of confirming the direction of cassette 10 every when inserting the cassette 10 into the case 1. Further, the user can smoothly insert the cassette 10 into the case 1 at one-time try in the dark or under various environment.

In the cassette accommodation case 1, the recess grooves 3a, 3b forming portion is formed thin in its wall thickness, and a thin wall portion obtained by forming the recess groove 3a, 3b is formed on both right and left sides in the cassette inserting direction. This serves to reduce a consumption amount of plastic which is used as a molding material, and to lower its cost, and further, to achieve a weight reduction of the cassette accommodation case.

A long slot-like opening portion 4 is formed in the cassette inserting direction at the substantially central portion of an upper surface of the cassette accommodation case 1, that is, the upper half 1A. In the case of taking the cassette 10 out of the cassette accommodation case 1, the user inserts a finger (e.g., a thumb) into the opening portion 4 so as to push out the cassette 10.

Further, the cassette accommodation case 1 is provided with a stopper member 5 for preventing the cassette 10 from suddenly jumping out in a state that the cassette 10 is accommodated or housed in the cassette accommodation case.

The stopper member 5 is formed integrally with the lower half 1B in a state of projecting therefrom, and is provided with an engaging protrusion 5a at its distal end portion. When the cassette 10 is inserted into and housed in the cassette accommodation case 1, the engaging protrusion 5a of the stopper member 5 is engaged with an edge of a hole 18 having an erroneous erase preventive detection pawl 17 of the cassette 10 as shown in FIG. 5, and thereby, the cassette 10 is held in a lightly locked state in the cassette accommodation case 1. Thus, it is possible to prevent the cassette 10 from suddenly jumping out (slipping-off) of the cassette accommodation case 1.

As described before, the cassette accommodation case 1 has a structure capable of inserting the cassette 10 regardless of directions of the cassette 10. For this reason, the stopper member 5, that is, stopper members 5(L) and 5(R) are symmetrically formed on both right and left sides in the cassette inserting direction so as to correspond to the above structure.

More specifically, FIG. 5A shows a state that the bulged portion 16 is situated on the cassette inserting direction left side and that the cassette 10 is inserted into and housed in the cassette accommodation case 1. In this case, the engaging protrusion 5a of the stopper member 5(R) on the cassette inserting direction right side is engaged with (fitted in) the hole 18 of the cassette 10 so as to hold the cassette 10 (at this time, the stopper member 5(L) on the cassette inserting direction left side is elastically deformed so as to be released from the cassette 10).

On the other hand, FIG. 5B shows a state that the bulged portion 16 is situated on the cassette inserting direction right side and that the cassette 10 is housed in the cassette accommodation case 1. In this case, the engaging protrusion 5a of the stopper member 5(L) on the cassette inserting direction left side is engaged with (i.e., fitted in) the hole 18 of the cassette 10 so as to hold the cassette 10 (at this time, the stopper member 5(R) on the cassette inserting direction right side is elastically deformed so as to be released from the cassette 10).

As described above, in the cassette accommodation case 1, even in the case where the cassette 10 is inserted therein from whichever directions, the cassette 10 is held in the cassette accommodation case 1 so as to prevent the cassette 10 from jumping out of the cassette accommodation case 1.

Further, the cassette accommodation case 1 is provided therein with a rotation stopper member 6 which inhibits a unnecessary rotation of the hub 14 of the cassette 10 so as to prevent a magnetic tape from being slack.

The rotation stopper member 6 is a plastic molding product which is molded of a PP (polypropylene) material, and a base plate 7 is formed with a rotation stopper protrusion 8 corresponding to the hub driving shaft insertion hole 12 of the cassette 10. The rotation stopper protrusion 8 is formed in a state of standing up so as to elastically rise or fall. The base plate 7 is fastened on a fastening (or caulking) protrusion 9, projecting from an inner surface of the lower half 1B at substantially the central portion, and thus, the rotation stopper member 6 is attached onto the lower half 1B.

When the cassette 10 is inserted into the cassette accommodation case 1, the rotation stopper protrusion 8 is pushed and falls down by the cassette 10. Then, when the cassette 10 is fully inserted in the cassette accommodation case 1, the hub driving shaft insertion hole 12 of the cassette 10 corresponds to the rotation stopper protrusion 8, and thereby, the rotation stopper protrusion 8 is elastically returned to a state of standing up, and is engaged with an engaging protrusion 14a projected from an inner peripheral surface of the hub 14, and thus, a rotation of the hub 14 can be inhibited.

In the rotation stopper member 6, the rotation stopper protrusion 8 is composed of three projecting pieces 8a, 8b and 8c, and has a structure in which two pieces of them are engaged with the hub 14 so as to inhibit a rotation of the hub 14.

More specifically, as shown in FIG. 4A and FIG. 5A, in a state that the bulged portion 16 is situated on the cassette inserting direction left side and that the cassette 10 is housed in the cassette accommodation case 1, two pieces 8a and 8b of the rotation stopper member 8 are engaged with the engaging protrusion 14a of the hub 14 so as to inhibit a rotation of the hub 14 (at this time, the remaining one piece 8c is in a state of being pushed and falling down by the cassette 10).

On the other hand, as shown in FIG. 4B and FIG. 5B, in a state that the bulged portion 16 is situated on the cassette inserting direction right side and that the cassette 10 is housed in the cassette accommodation case 1, two pieces 8b and 8c of the rotation stopper member 8 are engaged with the engaging protrusion 14a of the hub 14 so as to inhibit a rotation of the hub 14 (at this time, the remaining one piece 8a is in a state of being pushed and falling down by the cassette 10).

As described above, in the cassette accommodation case 1, even in the case where the cassette 10 is inserted therein from whichever directions, it is possible to securely inhibit an unnecessary rotation of the hub 14 by the rotation stopper protrusion 8, and therefore, a magnetic tape is prevented from being slack.

The cassette accommodation case 1 having the structure as described above has been already proposed by the present applicant.

However, the aforesaid conventional cassette accommodation case has the following problem. More specifically, in a state that the cassette 10 is housed, either of its right and left stopper members 5(L) and 5(R) is deformed, and is in a state of being released from the cassette 10. In such a state, if the cassette accommodation case is left for a long period, the stopper member 5 is left in a state of being deformed due to aged deformation, and is not almost returned to the original state even if the cassette 10 is taken out of the cassette accommodation case 1.

Further, the stopper member 5 deformed as described above loses a function as a stopper for holding the cassette 10 in the cassette accommodation case 1. For this reason, there arises a problem that the cassette 10 suddenly jumps out of the cassette accommodation case 1.

SUMMARY OF THE INVENTION

The present invention has been made taking the aforesaid problem in the prior art into consideration. It is, therefore, an object of the present invention to provide a cassette accommodation case which can prevent an aged deformation (i.e., a secular distortion) of a stopper member in a cassette inserted state, and can securely hold the cassette in the cassette accommodation case.

To achieve the above object, the present invention provides a cassette accommodation case which has a structure of inserting and housing a cassette in a transverse direction from an insertion opening formed on one side of the cassette accommodation case, and is formed with concave or recess grooves and for receiving a bulged portion of the cassette on an inner surface thereof, wherein the recess groove is provided therein with a stopper member having an engaging protrusion which is engaged with a hole, for example, a capstan inserting hole formed on the bulged portion of the cassette so as to hold the cassette in the cassette accommodation case.

With the above construction, in the cassette accommodation case of the present invention, when the cassette is inserted into and housed in the cassette accommodation case, the engaging protrusion of the stopper member is engaged with the hole of the bulged portion of the cassette, and thereby, the cassette is held in the cassette accommodation case. In such a structure, the stopper member is not left in a state of being deformed for a long period; for this reason, no aged deformation is generated in the stopper member. Therefore, the cassette is securely held in the cassette accommodation case, so that the cassette can be prevented from suddenly jumping out.

BRIEF DESCRIPTION OF THE DRAWINGS

FIG. 5, consists of FIG. 5A through 5B, is a transverse plan view partly in section showing a state that a cassette is housed in the conventional cassette accommodation case;

DETAILED DESCRIPTION OF THE PREFERRED EMBODIMENTS

Figure 1:
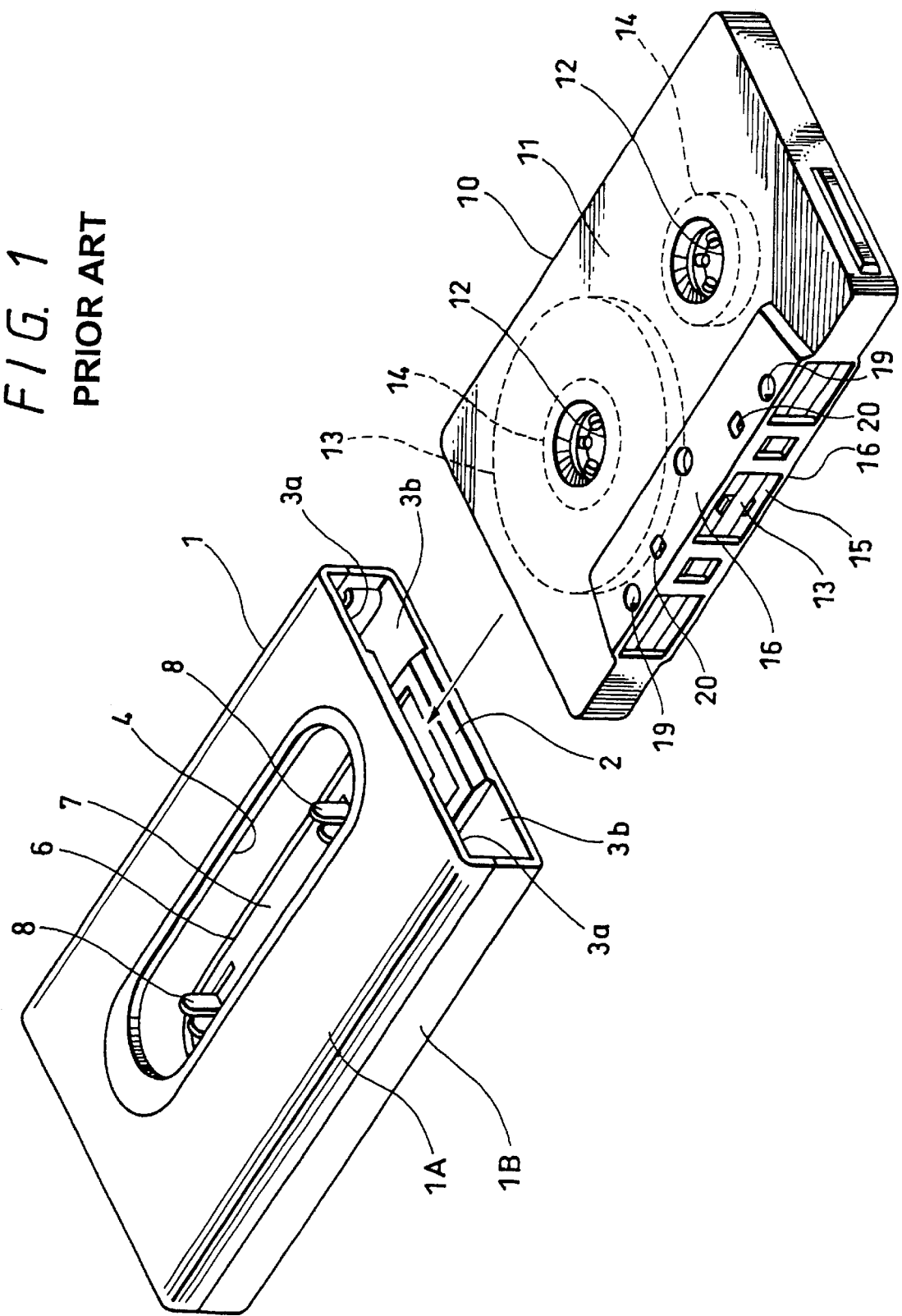
FIG. 1 is a perspective view showing a conventional cassette accommodation case.
Figure 2:
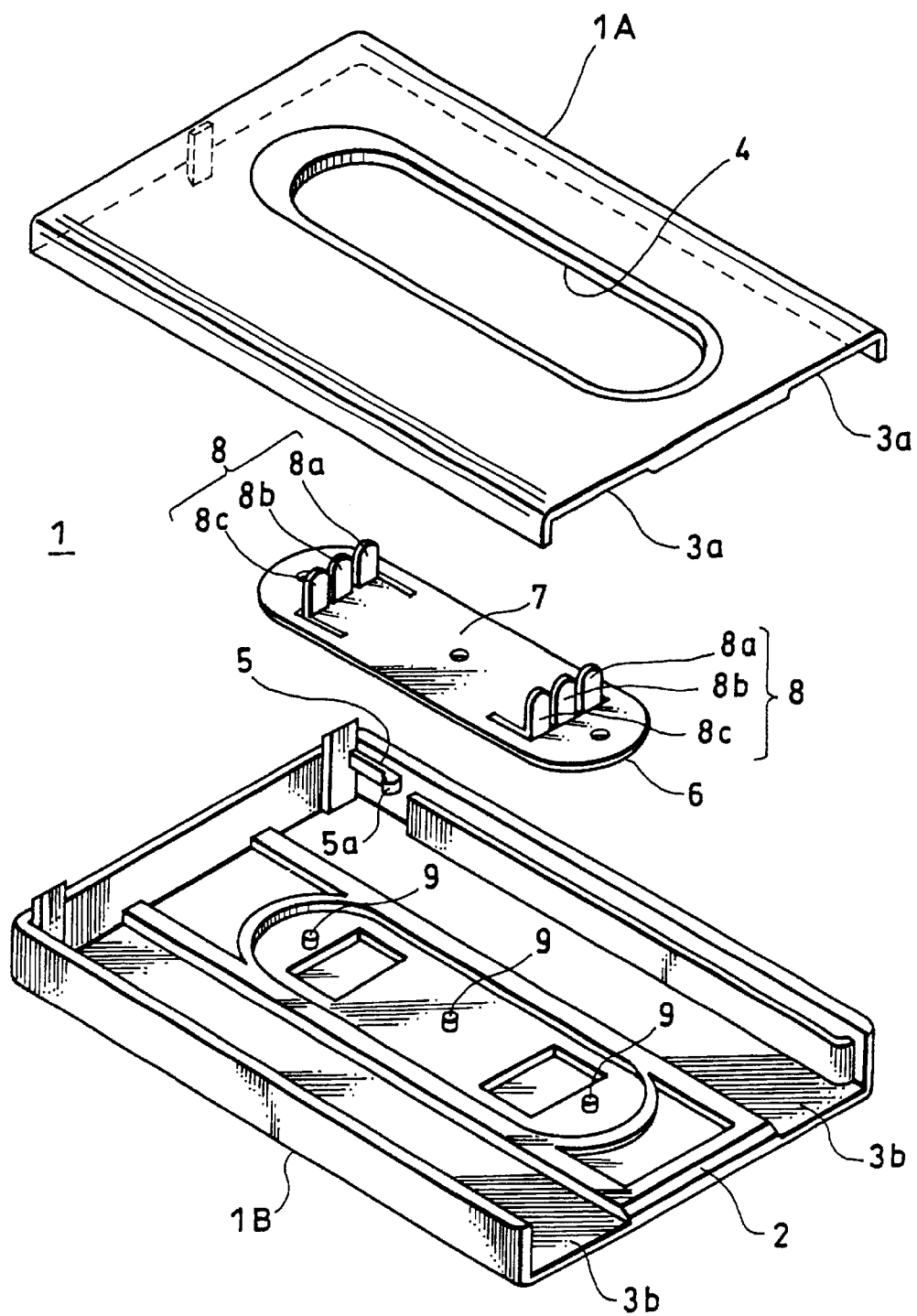
FIG. 2 is an exploded perspective view showing the conventional cassette accommodation case.
Figure 3:
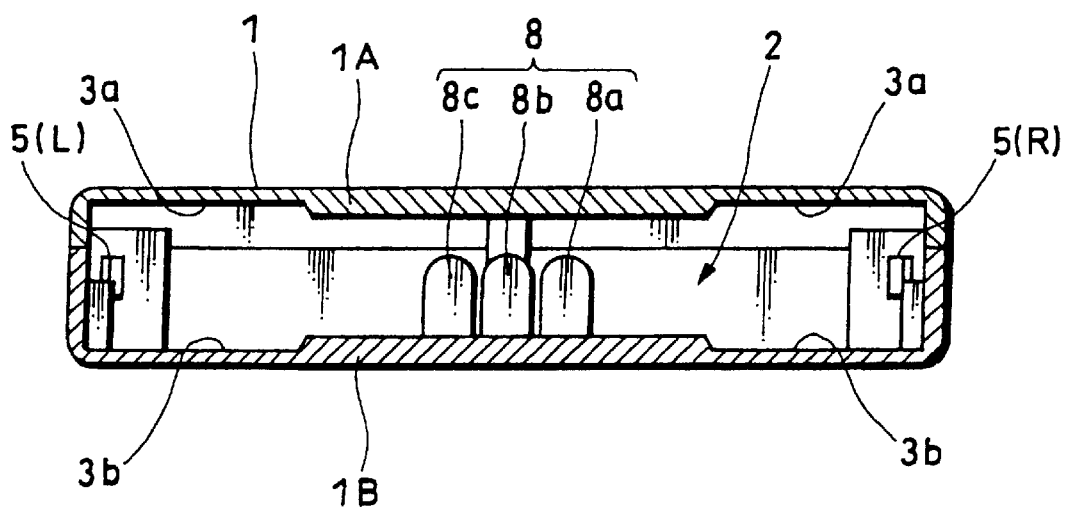
FIG. 3 is a side view showing the conventional cassette accommodation case.
Figure 4A:
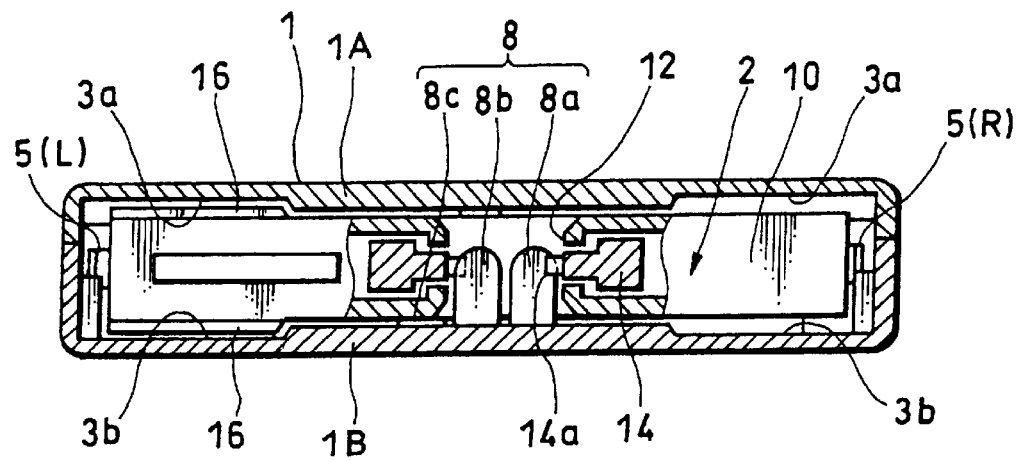
FIG. 4, consists of FIG. 4A through 4B, is a side view partly in section showing a state that a cassette is housed in the conventional cassette accommodation case.
Figure 4B:
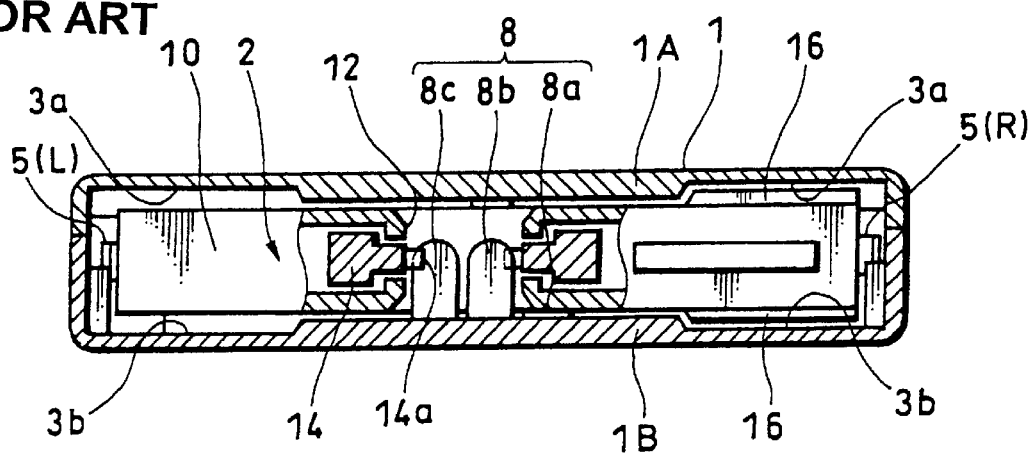
Figure 6:
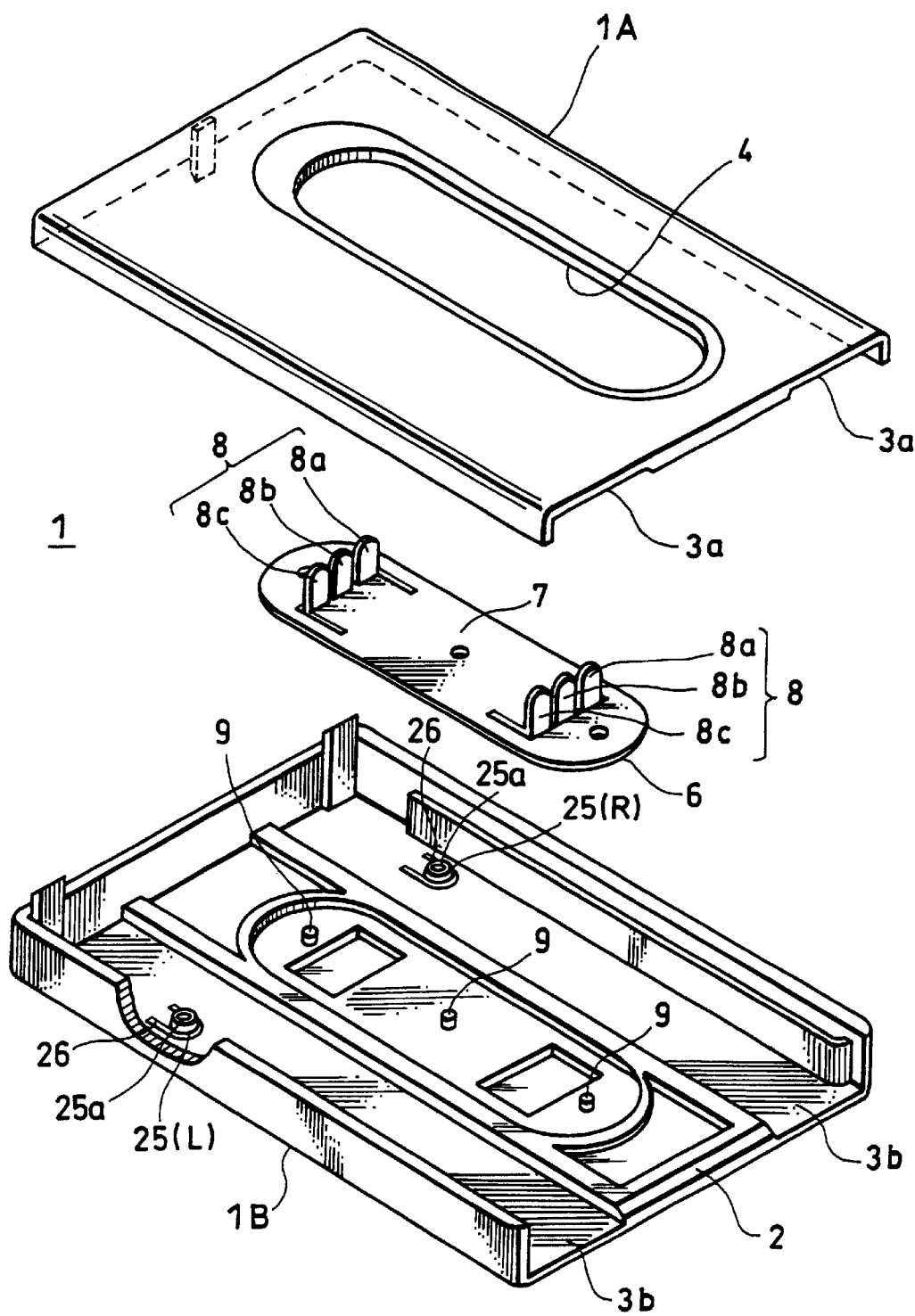
FIG. 6 is an exploded perspective view showing a cassette accommodation case of the present invention.
Figure 7:
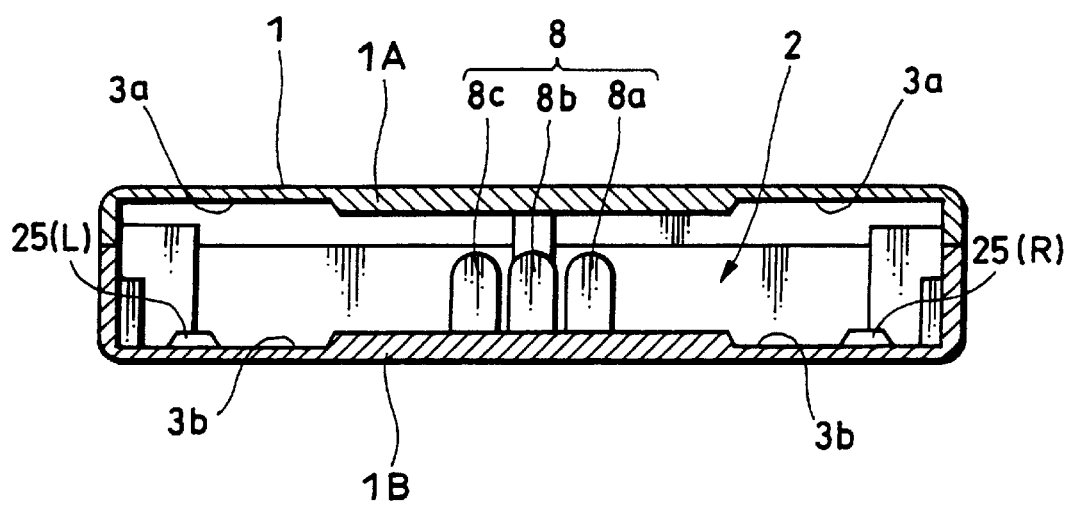
FIG. 7 is a side-sectional view showing the cassette accommodation case of the present invention.

A preferred embodiment of the present invention will be described below in detail with reference to the accompanying drawings, that is, FIG. 6 to FIG. 11.

A cassette accommodation case shown in this embodiment has basically the same structure as that shown in the conventional cassette accommodation case.

More specifically, a cassette accommodation case 1 of the present invention is constructed in a manner of combining an upper half 1A and a lower half 1B. In this case, the upper half 1A is a plastic molding product which is molded of e.g., a GPPS (general purpose polystyrene) material; on the other hand, the lower half 1B is a plastic molding product which is molded of e.g., a HIPS (high impact-proof polystyrene) material. The upper half 1A and the lower half 1B are integrally made in a state of being combined with each other by ultrasonic welding or the like.

One side face of the cassette accommodation case 1 is formed with an insertion opening 2 which is wholly opened, and the cassette accommodation case has a structure in which the cassette 10 is slidably inserted and stored in a transverse direction from the insertion opening 2.

The cassette accommodation case 1 is constructed so that the cassette 10 is accommodated or housed therein in a state that there is almost no gap. For this reason, in the interior of the cassette accommodation case 1, each of the upper and lower halves 1A and 1B is formed with concave or recess grooves 3a and 3b for receiving the bulged portion 16 of the cassette 10 in the transverse direction, that is, along a cassette inserting direction on its inner surface side.

These recess grooves 3a and 3b are symmetrically formed at both the left and right sides in the cassette inserting direction, and thereby, the cassette 10 can be inserted regardless of the orientations or directions of the cassette 10.

Figure 8A:
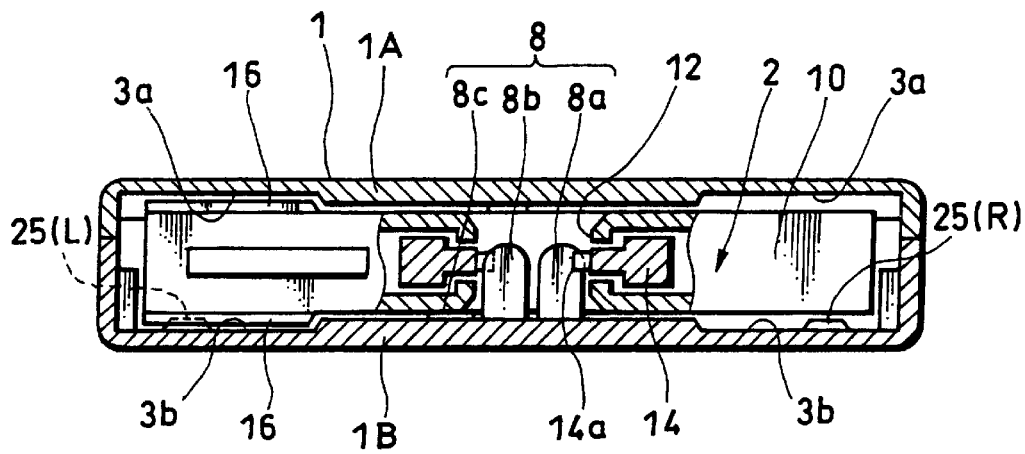
FIG. 8, consists of FIG. 8A through 8B, is a side view partly in section showing a state that a cassette is housed in the cassette accommodation case of the present invention.
Figure 8B:
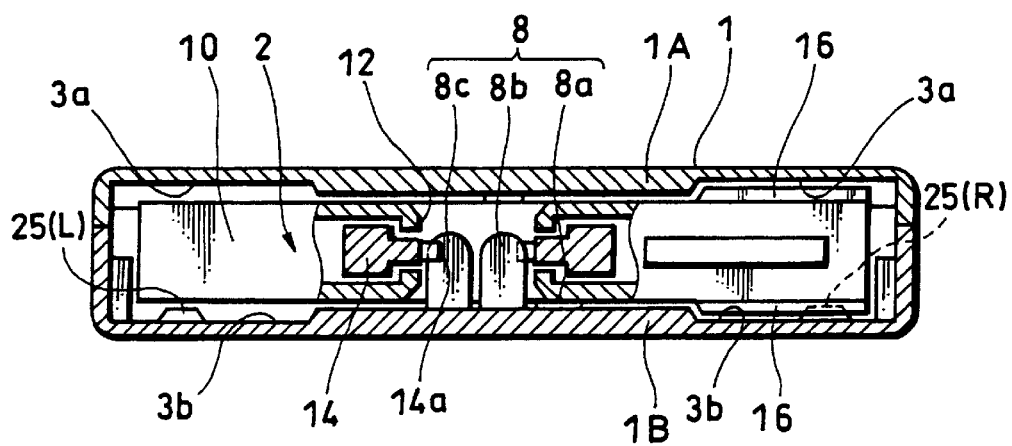

More specifically, FIG. 8A shows a state that the bulged portion 16 is situated to a cassette inserting direction left side and that the cassette 10 is housed in the cassette accommodation case 1. On the other hand, FIG. 8B shows a state that the bulged portion 16 is situated to a cassette inserting direction right side and that the cassette 10 is housed in the cassette accommodation case 1. As described above, it is possible to insert and store the cassette 10 in the cassette accommodation case 1 even if the cassette 10 is situated to whichever directions, and thereby, a user has no need of confirming the direction of cassette 10 even when inserting the cassette 10 into the cassette accommodation case 1. Further, the user can smoothly insert the cassette 10 into the cassette accommodation case 1 at a one-time try in the dark or under various environments.

In the cassette accommodation case 1, the recess groove 3a, 3b forming portion is formed thin in its wall thickness, and in this embodiment, a thin wall portion obtained by forming the recess groove 3a, 3b is formed on both right and left sides in the cassette inserting direction. This serves to reduce a consumption amount of plastic which is used as a molding material as compared with the conventional case, and to lower its cost, and further, to achieve a weight reduction of the cassette accommodation case.

A long slot-like opening portion 4 is formed in the cassette inserting direction at the central portion of an upper surface of the cassette accommodation case 1, that is, the upper half 1A. In the case of taking the cassette 10 out of the cassette accommodation case 1, the user inserts a finger (e.g., a thumb) into the opening portion 4 so as to push out the cassette 10.

Further, the cassette accommodation case 1 is provided with a stopper member 25 for preventing the cassette 10 from suddenly jumping out in a state that the cassette 10 is housed therein.

The stopper member 25 is provided in the recess groove 3b formed on the lower half 1B of the cassette accommodation case 1 together with a U-shaped notch groove 26 formed on the lower half 1B. Further the stopper member 25 is provided with an engaging protrusion 25a which is engaged with a capstan shaft insertion hole 19 of the bulged portion 16 of the cassette 10, as will be described later, at the distal end portion of the groove 26.

Figure 10:
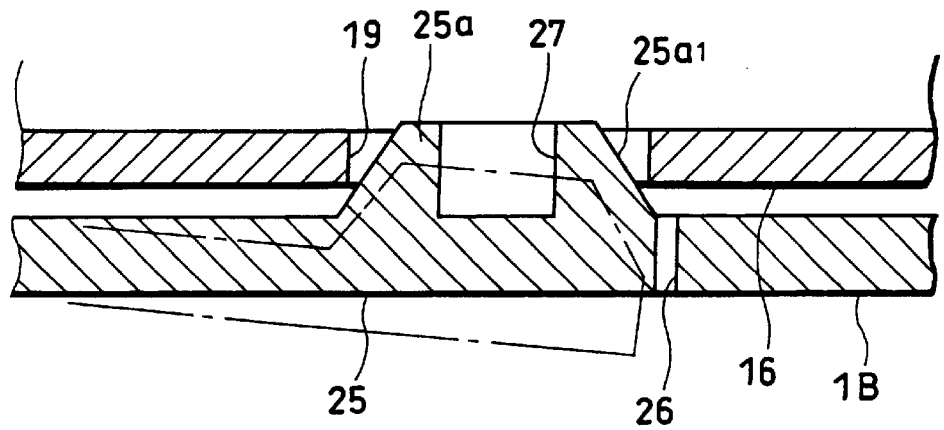
FIG. 10 is a partially longitudinal sectional view showing a stopper member.

As will be clear from FIG. 10, the engaging protrusion 25a of the stopper member 25 has a front (distal) edge portion 25$a_1$, which is formed like an inclined surface or as a tapered surface. Further, the engaging protrusion 25a is formed with a recess-like concave groove or hole 27 at the top end central portion thereof.

When the cassette 10 is inserted into the cassette accommodation case 1, the stopper member 25 is once pushed down by the bulged portion 16 of the cassette 10, and thereafter, when the cassette 10 is fully inserted into the cassette accommodation case 1, the engaging protrusion 25a is engaged with the capstan shaft insertion hole 19 of the bulged portion 16 of the cassette 10 by a resilience (i.e., an elastically rehousing force) of the stopper member 25. Thus, the cassette 10 is held in the cassette accommodation case 1 in a lightly locked state, so that the cassette 10 can be prevented from suddenly jumping out or slipping off of the cassette accommodation case 1.

As described before, the cassette accommodation case 1 has a structure capable of inserting the cassette 10 regardless of directions of the cassette 10. To this end, the stopper member 25, that is, stopper members 25(L) and 25(R) are symmetrically formed on both right and left sides in the cassette inserting direction so as to correspond to the above structure.

Figure 9A:
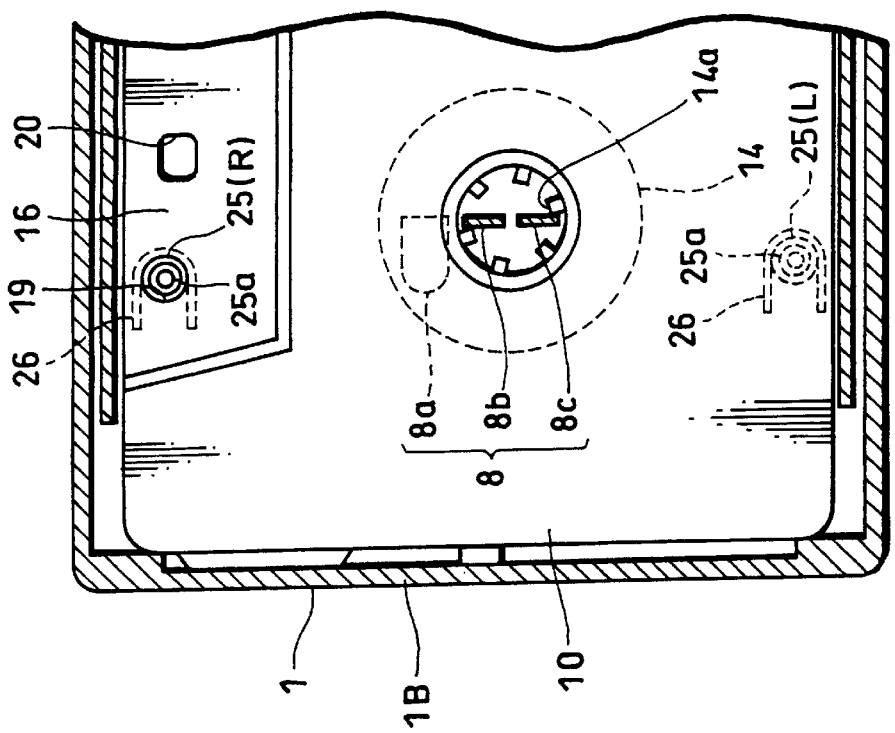
FIG. 9, consists of FIG. 9A through 9B, is a transverse plan view partly in section showing a state that a cassette is housed in the cassette accommodation case of the present invention.

More specifically, FIG. 9A shows a state that the bulged portion 16 is situated on the cassette inserting direction left side and that the cassette 10 is housed in the cassette accommodation case 1. In this case, the engaging protrusion 25a of the stopper member 25(L) on the cassette inserting direction left side is engaged with the capstan shaft insertion hole 19 of the cassette 10 so as to hold the cassette 10.

Figure 9B:
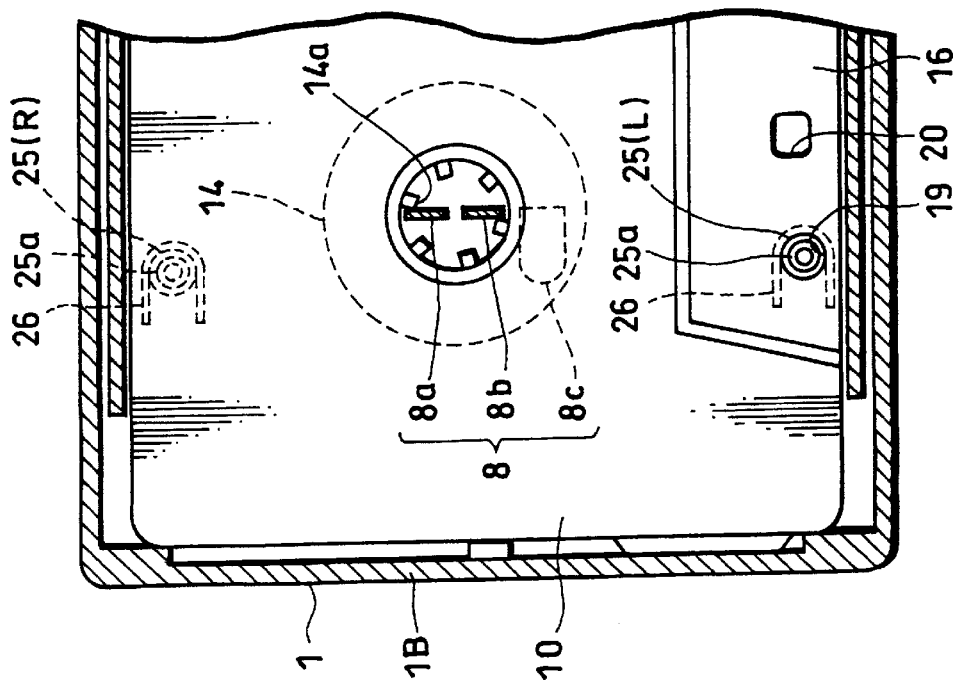

On the other hand, FIG. 9B shows a state that the bulged portion 16 is situated on the cassette inserting direction right side and that the cassette 10 is housed in the cassette accommodation case 1. In this case, the engaging protrusion 25a of the stopper member 25(R) on the cassette inserting direction right side is engaged with the capstan shaft insertion hole 19 of the cassette 10 so as to hold the cassette 10.

As described above, in the cassette accommodation case 1, even in the case where the cassette 10 is inserted thereinto from whichever directions, the cassette 10 is securely held in the cassette accommodation case 1 so as to prevent the cassette 10 from jumping out of the cassette accommodation case 1.

The cassette accommodation case 1 has a structure in which the stopper member 25 is formed in the recess groove 3b, and is engaged with the capstan shaft insertion hole 19 of the bulged portion 16 of the cassette 10. Thus, in the state where the cassette is housed, the stopper member 25 is not left in a state of being deformed for a long period. Therefore, no aged deformation is generated in the stopper member 25, so that the cassette 10 can be securely stored and held in the cassette accommodation case.

Further, the cassette accommodation case 1 has a structure in which the stopper member 25 is once pushed down by the bulged portion 16 of the cassette 10 when the cassette 10 is inserted into the cassette accommodation case 1, and thereafter, is engaged with the capstan shaft insertion hole 19. Thus, even in the case where there is unevenness in a wall thickness of the bulged portion 16 of the cassette 10, the cassette accommodation case 1 permits the unevenness in a wall thickness.

Furthermore, in the cassette accommodation case 1, the engaging protrusion 25a of the stopper member 25 has the distal or tip (front) edge $25a_1$ which is formed into an inclined surface, and thereby, the engaging protrusion 25a of the stopper member 25 can be smoothly engaged with and released from the capstan shaft insertion hole 19.

Figure 11:
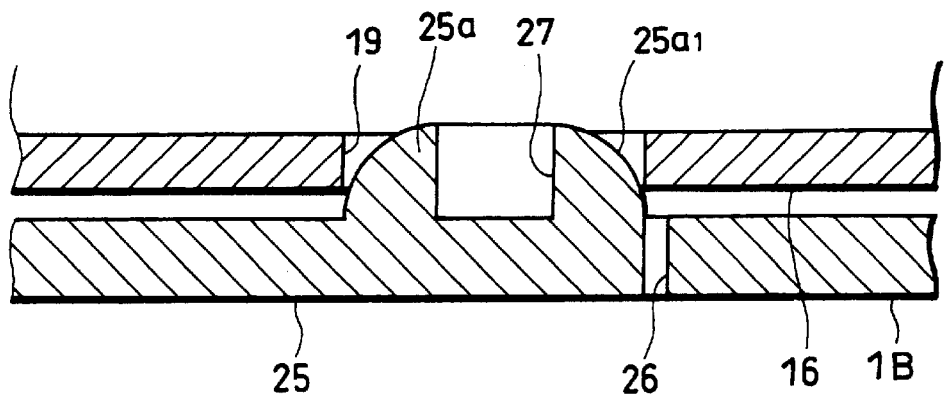
FIG. 11 is an example showing another shape of an engaging protrusion of the stopper member.

Also, the shape of the distal (front) edge $25a_1$ of the engaging protrusion 25a of the stopper member 25 may be a curved surface as shown in FIG. 11.

Moreover, the recess groove 27 is formed at the central portion on the distal end of the engaging protrusion $25a_1$ of the stopper member 25, and thereby, it is possible to prevent a so-called sink mark or shrinkage mark (i.e., deformation by a shrinkage of resin after molding) generated from a structure in which the engaging protrusion 25a is a thick wall. Therefore, the engaging protrusion 25a is securely engaged with the capstan shaft insertion hole 19 of the cassette 10, and also an appearance of the cassette accommodation case 1 can be preferably kept even in the case of viewing the engaging protrusion 25a from the backside of the cassette accommodation case 1.

Further, the cassette accommodation case 1 is provided therein with a rotation stopper member 6 which inhibits an unnecessary rotation of the hub 14 of the cassette 10 so as to prevent a magnetic tape from being slack.

The rotation stopper member 6 is a plastic molding product which is molded of a PP (polypropylene) material, and a base plate 7 is formed with a rotation stopper protrusion 8 corresponding to the hub driving shaft insertion hole 12 of the cassette 10. The rotation stopper protrusion 8 is formed in a state of standing up so as to elastically rise and fall. The base plate 7 is fastened on a fastening or caulking protrusion 9 projecting from an inner surface of the lower half 1B at approximately the central portion thereof, and thus, the rotation stopper member 6 is attached onto the lower half 1B.

When the cassette 10 is inserted into the cassette accommodation case 1, the rotation stopper protrusion 8 is pushed and falls down by the cassette 10. Then, when the cassette 10 is fully inserted in the cassette accommodation case 1, the hub driving shaft insertion hole 12 of the cassette 10 corresponds to the rotation stopper protrusion 8, and thereby, the rotation stopper protrusion 8 is elastically returned to a state of standing up, and is engaged with an engaging protrusion 14a projected from an inner peripheral surface of the hub 14, and thus, a rotation of the hub 14 can be inhibited.

In the rotation stopper member 6, according to the present embodiment, the rotation stopper protrusion 8 is composed of three projecting pieces 8a, 8b and 8c, and has a structure in which two pieces of them are engaged with the hub 14 so as to inhibit a rotation of the hub 14.

More specifically, as shown in FIG. 9, in a state that the bulged portion 16 is situated on the cassette inserting direction left side and that the cassette 10 is housed in the cassette accommodation case 1, two pieces 8a and 8b of the rotation stopper member 8 are engaged with the engaging protrusion 14a of the hub 14 so as to inhibit a rotation of the hub 14 (at this time, the remaining one piece 8c is in a state of being pushed and falling down by the cassette 10). on the other hand, as shown in FIG. 9B, in a state that the bulged portion 16 is situated on the cassette inserting direction right side and that the cassette 10 is housed in the cassette accommodation case 1, two pieces 8b and 8c of the rotation stopper member 8 are engaged with the engaging protrusion 14a of the hub 14 so as to inhibit a rotation of the hub 14 (at this time, the remaining one piece 8a is in a state of being pushed and falling down by the cassette 10).

As described above, in the cassette accommodation case 1, even in the case where the cassette 10 is inserted thereinto from whichever directions, it is possible to securely inhibit an unnecessary rotation of the hub 14 by the rotation stopper protrusion 8, and therefore, a magnetic tape is prevented from being slack.

Moreover, in the present embodiment, as is evident from figures, each distal end portion of pieces 8a, 8b and 8c of the rotation stopper protrusion 8 is formed like a curved shape, such as a circular arc. Thus, when inserting the cassette 10 into the cassette accommodation case 1 (or taking it out thereof), even if the cassette 10 is rubbed against the distal end portion of each of the pieces 8a, 8b and 8c, the surface of the cassette 10 is hard to be damaged; in other words, it is effective in protection of the cassette 10.

One preferred embodiment of the present invention has been described above; however, the present invention is not specially limited to the above embodiment.

For example, in the above embodiment, the cassette accommodation case 1 has a structure in which the engaging protrusion 25a of the stopper member 25 is engaged with the capstan shaft insertion hole 19 of the bulged portion 16 of the cassette 10, and thereby, the cassette 10 is held in the cassette accommodation case 1. The cassette accommodation case 1 may have a structure in which the engaging protrusion 25a of the stopper member 25 is engaged with the positioning reference hole 20 of the bulged portion 16 of the cassette 10, and thereby the cassette 10 is held in the cassette accommodation case 1.

As is evident from the above explanation, in the cassette accommodation case of the present invention, when the cassette is housed in the cassette accommodation case, the stopper member is engaged with the hole of the bulged portion of the cassette, and thereby the cassette is held in the cassette accommodation case. In such a structure, the stopper member is not left in a state of being deformed for a long period; for this reason, no aged deformation is generated in the stopper member. Therefore, the cassette is securely held in the cassette accommodation case, so that the cassette can be prevented from suddenly jumping out.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A cassette accommodation case which has a structure allowing insertion and housing of a cassette in a transverse direction, said case comprising:

an insertion opening formed on one side of the cassette accommodation case; and recess grooves for receiving a bulged portion of the cassette, said recess grooves being formed on an inner surface of the accommodation case, wherein said recess grooves are provided with a stopper member having an engaging protrusion which is positioned to engage a hole formed on the bulged portion of the cassette so as to hold the cassette in the cassette accommodation case.

2. The cassette accommodation case according to claim 1, wherein said stopper member is provided together with a notch groove formed in the cassette accommodation case.

3. The cassette accommodation case according to claim 1, wherein an edge of said engaging protrusion is formed into an inclined surface.

4. The cassette accommodation case according to claim 1, wherein said engaging protrusion is formed with a recess at a top central portion thereof.

5. A cassette accommodation case for housing a cassette having a bulged portion, comprising:

a housing having an opening in a first end;

a plurality of symmetrically arranged recess grooves formed on inner surfaces of, and extending within, said housing from said first end to a second end opposite said first end, said recess grooves being dimensioned to receive the bulged portion of the cassette; and a stopper member arranged on a portion of each of said recess grooves, each said stopper member being located and dimensioned to engage an aperture formed on the bulged portion of the cassette.

6. The cassette accommodation case according to claim 5, further comprising:

a groove extending through said housing and surrounding a portion of said stopper member thereby forming a web, wherein said stopper member is located on a distal end of said web.

7. The cassette accommodation case according to claim 6, wherein said stopper member comprises an inclined surface extending from said web to a top surface of said stopper member.

8. The cassette accommodation case according to claim 6, wherein said stopper member comprises a substantially curved surface extending from said web to a top surface of said stopper member.

9. The cassette accommodation case according to any one of claims 5, 6, 7, or 8, wherein said stopper member comprises a recess formed in a top surface thereof.

10. A device for holding a cassette having a bulged portion along a portion thereof, said device comprising:

housing means, having an opening in an end portion thereof, for housing the cassette therein;

recess means, formed on an inside portion of said housing means, for receiving the bulged portion of the cassette therein; and stopper means, formed on a portion of said recess means, for (1) engaging an aperture formed on the bulged portion of the cassette and (2) holding the cassette within said housing means.

11. The device according to claim 10, further comprising:

a plurality of said recess means formed symmetrically on the inside portion of said housing means, each of said plurality of recess means having at least one of said stopper means formed on a portion thereof.

12. The device according to any one of claims 10 or 11, further comprising:

a recess formed in a top portion of said stopper means.

* * * * *